(12) United States Patent
Posch et al.

(10) Patent No.: US 8,182,028 B2
(45) Date of Patent: May 22, 2012

(54) VEHICLE BODY

(75) Inventors: Tobias Posch, Pforzheim (DE); Okan Goenueldinc, Ostfildern (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/014,050

(22) Filed: Jan. 26, 2011

(65) Prior Publication Data
US 2011/0181076 A1 Jul. 28, 2011

(30) Foreign Application Priority Data
Jan. 28, 2010 (DE) .......................... 10 2010 006 502

(51) Int. Cl.
*B62D 25/08* (2006.01)
(52) U.S. Cl. ................................................ 296/203.04
(58) Field of Classification Search .................. 296/900, 296/180.1, 180.5, 193.01–193.12, 203.01–203.04
See application file for complete search history.

(56) References Cited

U.S. PATENT DOCUMENTS

| | | | |
|---|---|---|---|
| 4,618,163 A | 10/1986 | Hasler et al. | |
| 6,193,273 B1 | 2/2001 | Novak et al. | |
| 6,450,567 B2 * | 9/2002 | Toba et al. | 296/187.11 |
| 6,749,360 B2 | 6/2004 | Abels | |
| 7,111,898 B2 * | 9/2006 | Rinklin | 296/180.1 |
| 7,481,482 B2 | 1/2009 | Grave et al. | |
| 2005/0253423 A1 * | 11/2005 | Wolf | 296/208 |
| 2008/0238149 A1 * | 10/2008 | Yamashita | 296/203.01 |
| 2010/0026044 A1 * | 2/2010 | Ramin et al. | 296/180.1 |
| 2011/0175398 A1 * | 7/2011 | Kiley et al. | 296/193.04 |

FOREIGN PATENT DOCUMENTS

| | | |
|---|---|---|
| DE | 1 710 008 | 10/1955 |
| DE | 199 15 277 | 10/2000 |
| DE | 199 61 425 | 7/2001 |
| DE | 10 2007 063 246 | 7/2009 |
| DE | 10 2008 036 188 | 2/2010 |
| EP | 0 146 716 | 12/1988 |
| EP | 1 601 568 | 1/2008 |

* cited by examiner

*Primary Examiner* — Dennis Pedder
(74) *Attorney, Agent, or Firm* — Gerald E. Hespos; Michael J. Porco

(57) ABSTRACT

A vehicle body for a motor vehicle has a vehicle rear end with body inner side parts spaced apart from one another and delimiting an engine bay. An assembly support runs in the vehicle transverse direction between the two body-side side parts. The assembly support is formed as a light metal forged part. Weight-optimized stiffening of the vehicle rear end can be obtained in this way.

5 Claims, 1 Drawing Sheet

VEHICLE BODY

CROSS-REFERENCE TO RELATED APPLICATION

This application claims priority under 35 USC 119 to German Patent Application No. 10 2010 006 502.1, filed on Jan. 28, 2010, the entire disclosure of which is incorporated herein by reference.

BACKGROUND OF THE INVENTION

1. Field of the Invention

The invention relates to a vehicle body for a motor vehicle. The invention also relates to an assembly support for a motor vehicle.

2. Description of the Related Art

German Patent Application DE 10 2008 036 188.7 discloses a generic vehicle body for a motor vehicle with a vehicle rear end with body inner side parts spaced from one another and outer rear-end paneling. An assembly support runs in the vehicle transverse direction between the two body inner side parts. The assembly support is connected fixedly to the two inner side parts by screws and forms a stiffening body cross member. The disclosure of DE 10 2008 036 188.7 is intended to stiffen the vehicle rear end with a simple structure and to form a subassembly for a retractable and deployable rear spoiler.

EP 0 146 716 B1 discloses a vehicle body with tube pieces that are joined together by junction elements to form a supporting structure. The tube pieces are extruded profiles produced from light metal so that the car body can be of comparatively lightweight.

EP 1 601 568 B1 discloses a motor vehicle with an air-guiding device that can be deployed by a drive and that has an air-guiding surface. A beyond-dead-center position of a setting-out pivot lever of a setting-out mechanism in the deployed spoiler position ensures that a pressure on the deployed air guiding surface cannot collapse the setting-out mechanism.

The invention is concerned with a vehicle body that has a high level of stiffness and a comparatively low weight.

SUMMARY OF THE INVENTION

The invention relates to a vehicle body for a motor vehicle having a vehicle rear end with inner side parts spaced apart from one another and an outer rear line of inserting between the two side parts. The vehicle body includes an assembly support formed as a light metal forged part and that runs in the vehicle transverse direction. In this way, it is possible to provide a stiff rear-end body structure and a receiving module for pre-assemblable components, such as a rear spoiler or the like. The assembly support of the invention is formed as a light metal forged part and has several decisive advantages as compared to previous assembly supports formed, for example, as cast parts. The advantages include: process reliability, high joint quality, high elongation at fracture, high fracture toughness and considerably improved fatigue properties. Furthermore, it is possible to produce such an assembly support formed as a light metal forged part with high dimensional accuracy. Thus, reworking expenditure can be reduced considerably. The fine surface provided in the case of light metal forged parts also may be refined, for example by anodization. Furthermore, such light metal forged parts have no cavities and therefore result in high quality. A decisive advantage, however, is the low weight obtained by the assembly support of the invention, which is of particular importance in sports car engineering.

At least selected regions of the assembly support preferably has a framework structure. The framework structure makes it possible to design the assembly support to withstand loading while being optimized in terms of weight. In comparison with an assembly support formed of solid material, it is possible to calculate the profile of the individual struts of the framework structure in advance by means of a finite element program, so that struts of the type are arranged only in those regions of the assembly support in which they are actually required for dissipating loads. Such framework structures already have been used successfully for a long time, for example in pylon construction for high-voltage lines, and are capable of dissipating high loads while simultaneously having a low own weight.

The features specified above and the features yet to be explained below can be used in the respectively specified combination and also in other combinations or individually without departing from the scope of the invention.

DETAILED DESCRIPTION OF THE PREFERRED EMBODIMENT

Figure 1:
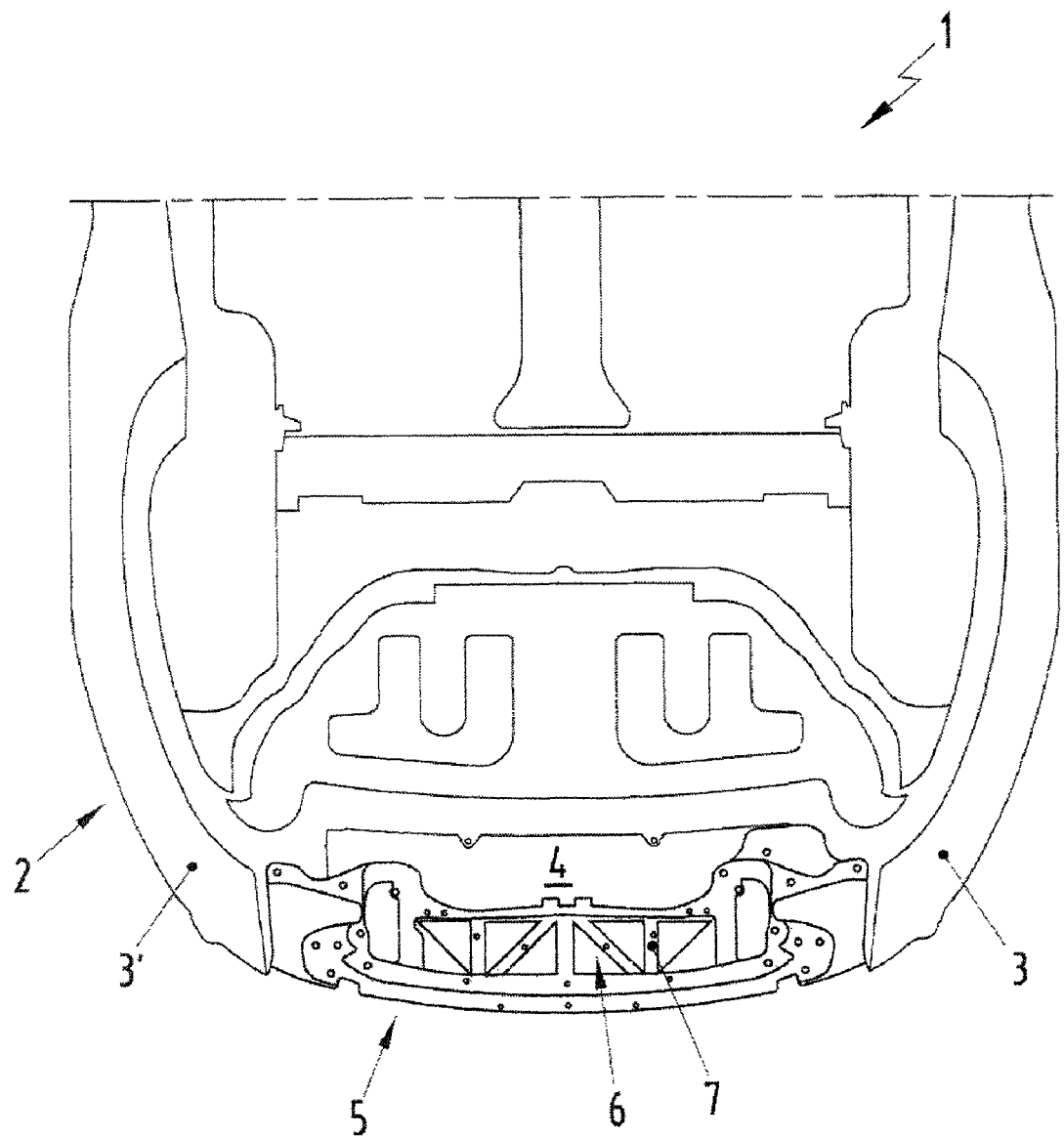
FIG. 1 shows a vehicle body according to the invention having an assembly support arranged at the rear end.

A vehicle body 1 according to the invention of an otherwise only partially illustrated motor vehicle has a vehicle rear end 2 as shown in FIG. 1. The vehicle body 1 which comprises body-side inner side parts 3 and 3' that are spaced apart from one another and that delimit an engine bay 4. Inserted between the two inner side parts 3 and 3' is an assembly support 5 that runs in the vehicle transverse direction and that is formed as a light metal forged part, in particular as an aluminum forged part. Other light metals, for example magnesium, can be taken into consideration for forming the assembly support 5. The assembly support 5 is releasably connected, in particular screwed, at its longitudinal ends to the two side parts 3 and 3'. In general, the assembly support 5 functions both to stiffen the vehicle rear end 2 in the vehicle transverse direction and also to receive further components, for example an air-guiding device, spoiler or wing (not shown). Forming the assembly support 5 as an aluminum forged part, results in a comparatively low weight, but also offers the following advantages over an assembly support formed as an aluminum cast part: high process reliability, high joint quality, high elongation at fracture, high fracture toughness and improved fatigue properties. Furthermore, the assembly support 5 according to the invention has the great advantage that, with said assembly support, it is also possible to produce complex shapes that require no reworking or only an extremely small amount of reworking.

Aluminum forged parts furthermore have a high level of dimensional accuracy and are conventionally free from pores and cavities, as a result of which it is likewise possible to ensure high quality. The inherently very fine surface of the assembly support 5 formed as a light metal forged part may be refined, for example by anodization. Such a fine structure of the assembly support 5 can be produced only to a limited extent during casting on account of the flow behavior, since the liquid light metal solidifies comparatively quickly in thin ducts. This would also result in a large number of joint lines which, as a result of a convergence of flow fronts, would weaken the assembly support in terms of strength. In a casting process, there is also the great disadvantage that different sizes of material accumulations result in different rates of cooling of the assembly support, which can lead to distortion.

Considering more closely the assembly support 5 of FIG. 1, it can be seen that at least regions of the assembly support 5 have a framework structure 6 with individual struts 7. Similarly to a high-voltage pylon, such a framework structure 6 permits a high degree of stiffness while simultaneously having a low weight. Here, the position of the individual struts 7 may be calculated in advance, for example by means of a finite element program, such that the struts are provided only at those locations at which they are imperatively required for load dissipation. Such an assembly support 5 equipped with the framework structure 6 according to the invention, while having a further reduced weight, is therefore capable of absorbing and dissipating high loads.

In general, the assembly support 5 may be produced in a drop forging process, as a result of which such an assembly support 5 can be produced firstly with a high level of quality and secondly in a cost-effective manner. The assembly support 5 or some other similar support formed as a light metal forged part also can be used at some other location in the motor vehicle.

The assembly support provided with a framework structure and composed of light metal could also be produced in a casting process.

What is claimed is:

1. A vehicle body for a motor vehicle, comprising a vehicle rear end with body inner side parts spaced apart from one another in a vehicle transeverse direction and delimiting an engine bay therebetween, and an assembly support running in the vehicle transverse direction between the two body side parts, the assembly support being formed as a light metal forged part having a framework structure at least in regions, the framework structure including at least two transverse supports extending in the vehicle transverse direction rearward of the engine bay, a plurality of transversely spaced longitudinal struts extending between the two transverse supports and being aligned in a vehicle longitudinal direction that is perpendicular to the vehicle transverse direction and a plurality of diagonal struts extending between the two transverse supports and being aligned diagonally to both the vehicle transverse direction and the vehicle longitudinal direction.

2. The vehicle body of claim 1, wherein the assembly support is formed as an aluminum forged part or as a magnesium forged part.

3. The vehicle body of claim 1, wherein the framework structure is anodized.

4. The vehicle body of claim 1, wherein the framework structure is screwed securely to the two body side parts.

5. The vehicle body of claim 1, wherein the assembly support is a stiffening support.

* * * * *